Oct. 30, 1962  A. KASHA  3,060,666
CORN HARVESTER RAKE ATTACHMENT
Filed June 15, 1960  2 Sheets-Sheet 1

Alex Kasha
INVENTOR.

BY *Clarence A. O'Brien*
*and Harvey B. Jacobson*
Attorneys

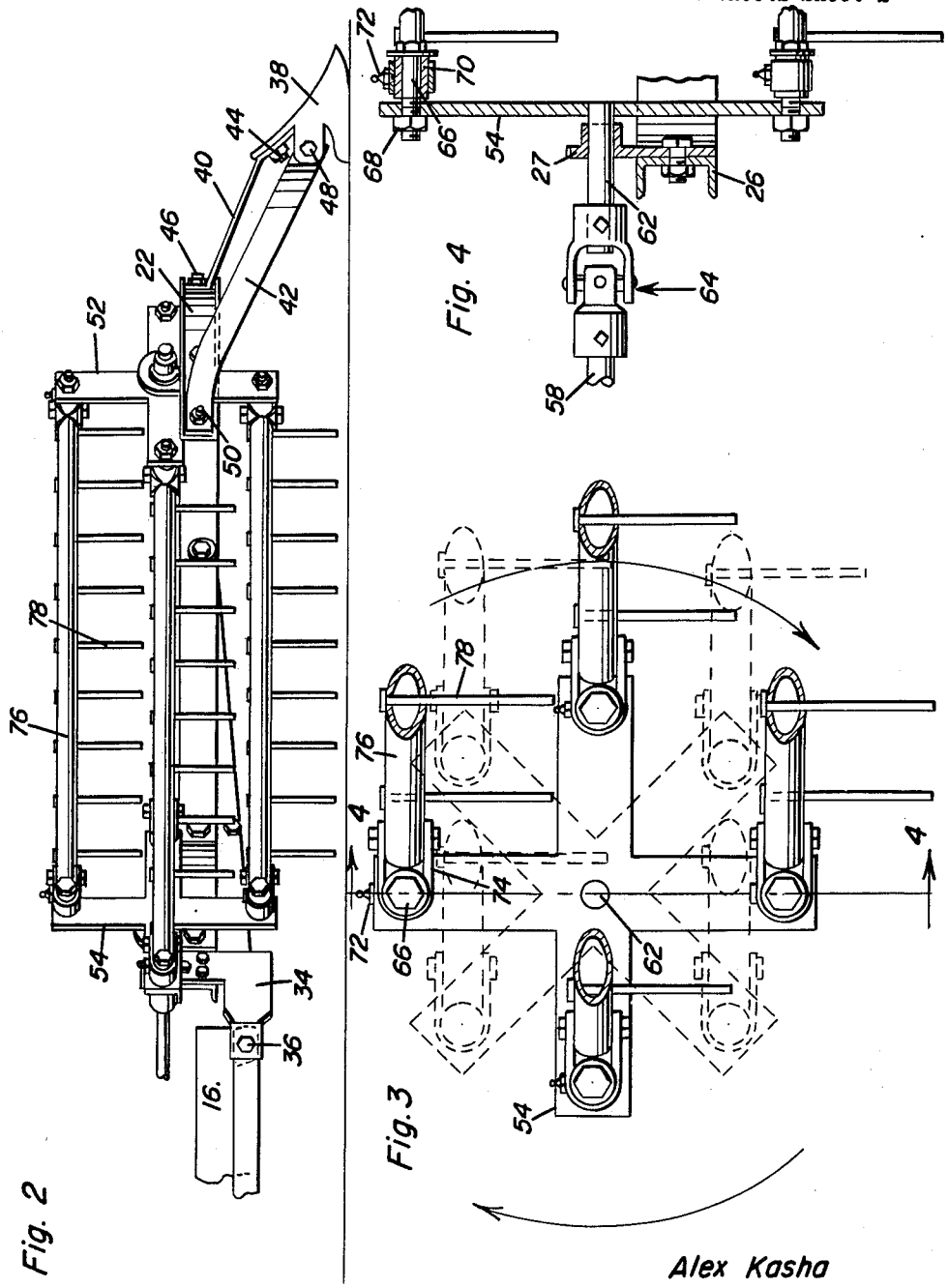

3,060,666
CORN HARVESTER RAKE ATTACHMENT
Alex Kasha, R.R. 4, North Platte, Nebr.
Filed June 15, 1960, Ser. No. 36,442
4 Claims. (Cl. 56—119)

This invention relates to an attachment for a corn harvester which is designed to pick up corn which has been broken or blown from the standing stalks by a raking action.

It is therefore a primary object of this invention to provide an attachment for an ordinary corn picker which is otherwise unable to pick up any of the corn that has become detached from the stalk and lie in the corn rows.

Another object of this invention is to provide a raking attachment for a harvester machine which is positioned forwardly thereof and by a novel raking action effectively gathers and/or gently propels a crop that has fallen from its stalk into the crop row for subsequent reception by the harvester machine.

A further object of this invention is to provide a raking attachment for a crop harvester which is readily and adjustably attachable to the harvester and has a leveling device incorporated therewith for properly maintaining the raking means in spaced relation to the ground surface.

In accordance with the foregoing objects the attachment in accordance with this invention, includes a pair of rake supporting frames pivotally attached to either side of the inlet throat of the harvester, said frame extending forwardly therefrom at an angle to the harvester center line which is in alignment with the crop row. The frames are supported at their forward ends relative to the ground by means of ground engaging skids which thereby respond to the irregularities of the ground so as to vary the position of the raking frames and maintain them at a predetermined distance above the ground. Each of the raking frames includes a plurality of rake members longitudinally disposed parallel to the angular disposition of the raking frame and spaced throughout from the crop row on either side thereof, each of said rake members being pivotally connected at its outer end to a pair of spider members which are rotatably mounted in the frame at an angle to the rake members. Accordingly, rotation is imparted to one of the spider members adjacent the rearward end of the rake frame so as to impart movement to the rake members in both rotationally and in an axial direction along the longitudinal axis of each rake member. Each of the rake members has a plurality of downwardly suspended raking teeth which are brought into proximity with the ground surface as the rake member is rotated toward the ground and toward the crop row for fallen crop gathering purposes while at the same time said member is being moved in a rearward direction relative to the raking frame and attachment for crop propelling purposes. The rotary input to the spider member is therefore so geared to the forward motion of the harvester, that the rearward movement of the raking member as it is raking will exceed by a small amount the forward movement of the harvester and attachment to thereby gently sweep or rake the fallen crop toward the crop row and rearwardly into the harvester inlet.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 2 is a side elevational view of one half of the rake attachment as viewed from a plane indicated by section line 2—2 in FIGURE 1.

FIGURE 3 is a sectional view taken through a plane indicated by section line 3—3 in FIGURE 1.

FIGURE 4 is a sectional view taken through a plane indicated by section line 4—4 in FIGURE 3.

Figure 1:
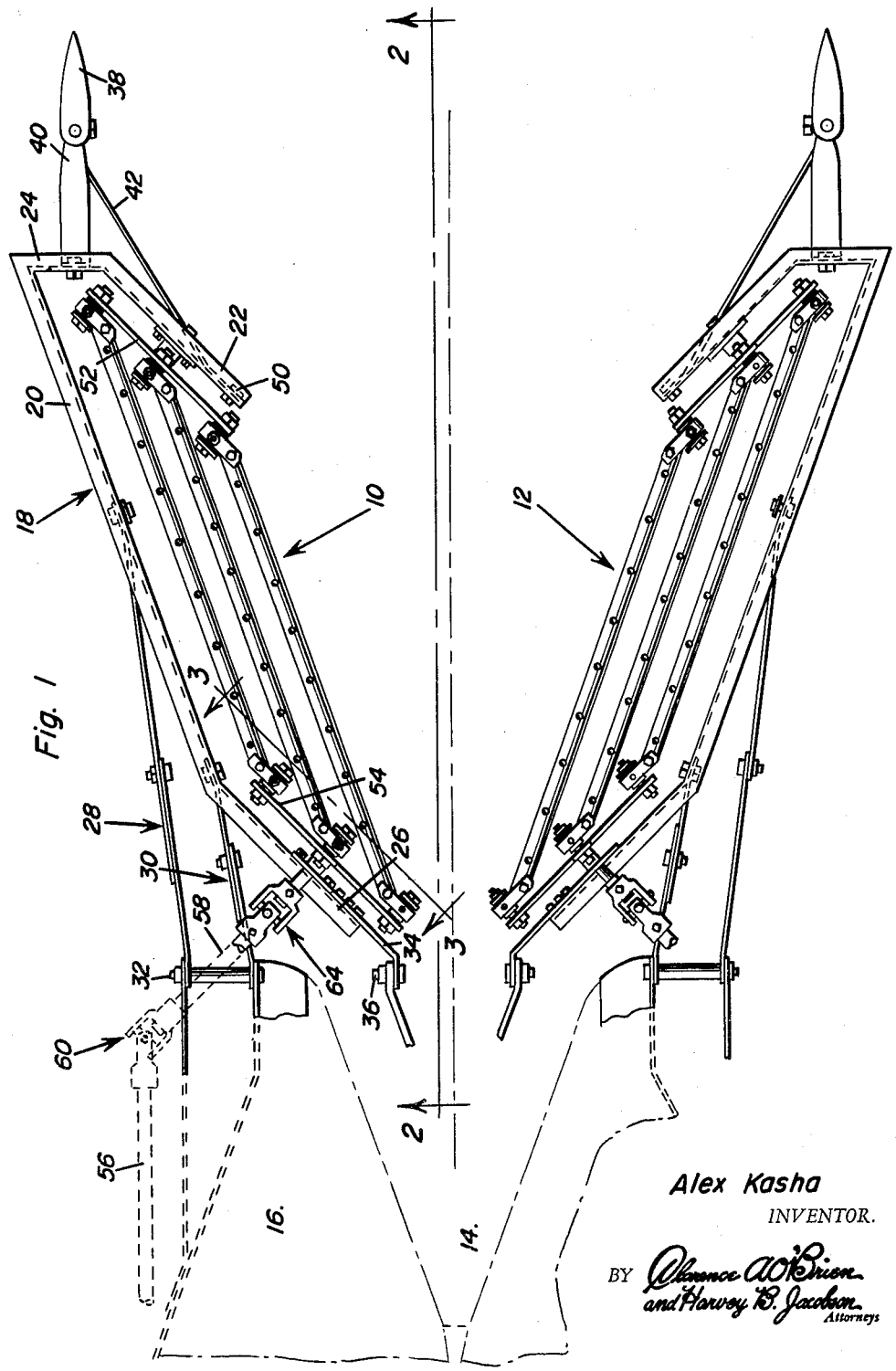
FIGURE 1 is a top plan view of the rake attachment in accordance with this invention.

Referring to the drawing in detail, FIGURE 1 illustrates the attachment which consists of two elongated sections 10 and 12 which are mirror images of each other being otherwise identical to each other in construction. The two sections of the attachment are connected on either side of the corn harvester inlet 14 of harvester 16 as shown by dotted lines in FIGURE 1. The angle between the elongated sections 10 and 12 is necessarily an acute angle as illustrated so that the sections do not extend laterally to such an extent as to interfere with crop rows adjacent to the row being stripped by the harvester.

Section 10 of the attachment will be described in detail, it being understood of course that section 12 is of identical construction. As will be seen in FIGURES 1 and 2, the attachment includes a frame assembly generally indicated by reference numeral 18 which includes a frame member 20 which is disposd at an angle to a center line through the harvester inlet which would be in line with a row of cornstalks. At the forward end of the frame assembly 18 there is disposed a spider mounting portion 22 interconnected with the frame member 20 by means of a lateral portion 24, the frame members 20, 22 and 24 being made of channel-shaped elements as will be apparent in FIGURE 2. The rear portion of the frame assembly 18 includes a second spider mounting portion 26 which is disposed parallel to the other spider mounting portion 22. The frame assembly is pivotally connected to the harvester 16 by means of adjustable strap iron connecting members 28 and 30 which are pivotally connected to the side of the harvester inlet portion by means of bolt 32 while the rear frame portion 26 is pivotally connected to the harvester frame by means of adjustable strap iron member 34 connected to the harvester frame by means of bolt 36. The frame assembly 18 is accordingly pivotally movable in a vertical plane about a horizontal axis through bolts 32 and 36.

In order to support the frame assembly 18 at its forward end so that it may be maintained at a proper level above the ground surface, a depth controlling shoe guide 38 is provided. The shoe guide 38 is adjustably and yieldably connected to the frame assembly 18 by means of strap iron members 40 and 42. Member 40 is connected to the shoe by means of bolt 44 while the member 40 is connected to the frame portion 24 by means of bolt 46. The member 42 interconnects the shoe member 38 to the frame portion 22 by means of bolts 48 and 50 connected respectively to the shoe 38 and to the frame portion 22. It will therefore be apparent that the shoe or skid member 38 will respond to the irregularities of the ground surface and accordingly pivotally adjust the frame assembly 18 about its pivot connections 32 and 36.

Referring now to FIGURES 1 and 2, it will be observed that the frame portions 22 and 26 respectively rotatably mount spider members 52 and 54 disposed at forward angles with respect to the crop row center line. The spider member 54 is rotatably driven from a power take-off on the harvester 16 which is connected to the spider member 54 by means of a shaft 56 and universal shaft 58 interconnecting shaft 56 by means of universal joint 60 as seen in FIGURE 1.

Referring now to FIGURE 4 it will be seen that the universal shaft 58 is connected to a spider shaft 62 by means of universal joint 64. The spider shaft 62 is rotatably journaled by bearing bracket 27 secured to the frame portion 26 of the frame assembly and is rigidly connected to the spider member 54. The spider member 52 at the forward end of the frame assembly is similarly journaled within the frame portion 22 of the frame assembly.

Referring now to FIGURES 2 and 3, it will be observed that each of the spider members is composed of a pair of perpendicular cross arms. The spider member 54 will be described in detail it being understood of course that the identical construction is present in spider member 52. It will therefore be observed that the spider member 54 has fixed to each of its outer radial end portions of the cross arms a plurality of bolt members 66 which are secured to the spider arms by being threadedly engaged within apertures therein and held thereon by means of nut member 68. As will be seen in FIGURE 4, a sleeve 70 is loosely journaled on each of the bolts 66 and has securely attached thereto by means of setscrews 72 a U-bolt member 74 as will be more clearly seen in FIGURE 3. Each of the U-bolt members 74 is connected to a longitudinally disposed rake member in the form of a tubular member 76. Accordingly, each of the tubular members 76 pivotally interconnects corresponding spider arms on each of the spider members 52 and 54. Also, each of the tubular members 76 has a plurality of spikes 78 extending therethrough and being suspended in a vertical position, said spikes 78 being rigidly secured as for example by welding at their head portions to the tubular member.

As will be shown in FIGURE 3, the spider member 54 is rotated in a clockwise direction and at an ideally low speed and high torque for the more rugged corn crop raking involved, by the power take-off drive from the harvester. It will also be observed that because of the parallel arrangement of both of the spider members 52 and 54, the tubular members 76 will be maintained in parallel position so as to maintain the raking spike members 78 in their vertical position at all times. Accordingly, upon rotation of the spider members each of the raking tubular members with the raking spikes thereon will be successively brought into proximity with the ground surface effectively moving thereby the broken corn engaged with the spikes towards the center line running through the cornstalk row so that they will be gathered for reception within the harvester inlet 14 as it moves forwardly thereover. It will also be observed that the raking spikes 78 have two components of movement one being toward the crop row while the other component of movement is in a rearward direction, which rearward movement is relative to the frame 18. Inasmuch as the frame 18 is being moved forwardly by means of the harvester the rearward movement of the raking spikes 78 relative to the frame is such that there will be a slight absolute rearward movement of the raking spikes relative to the ground so as to gently sweep the broken corn crop rearwardly into the harvester inlet in addition to raking the broken corn toward the crop row. Accordingly, by adjustment of the speed of rotation of the spider member 54 relative to vehicle speed by the power take-off from the harvester or by adjustment of the angular disposition of the rake frame 18 or spider 54, the requisite velocity may be imparted to the raking tubular members 76. It will therefore also be apparent that the corresponding spider members on section 12 of the raking attachment will be rotated in an opposite direction from that of the spiders 52 and 54 so as to perform in a similar manner as section 10.

From the foregoing description operation of the raking attachment will be apparent. It will therefore be recognized that with the attachment made in accordance with this invention, a harvester may pick up corn that has fallen from the stalk and lie adjacent the corn row by raking and/or sweeping the detached corn toward the corn row rearwardly into the harvester inlet. The above function is accomplished by a novel raking action performing its function with a high degree of efficiency.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rake attachment for a corn harvester comprising, frame means operatively connected to the harvester and extending forwardly therefrom at an angle to a center line through a crop row and between adjacent crop rows, rake means disposed parallel to said frame means and spaced from the center line throughout, rotatable means journaled in said frame means at a forward angle thereto and operatively connected to said rake means for imparting rotation and movement to said rake means in a rearward direction relative to the frame means and parallel thereto as the frame means is moved forwardly for both raking the crop toward the crop row center line and propelling the crop rearwardly, said rake means comprising a plurality of parallel longitudinal rake members, each having a plurality of downwardly suspended raking teeth, said rake members being successively positioned downwardly toward the ground as it is moved rearwardly along its longitudinal axis parallel to the frame means.

2. A rake attachment for a corn harvester comprising, frame means operatively connected to the harvester and extending forwardly therefrom at an angle to a center line through a crop row and between adjacent crop rows, rake means disposed parallel to said frame means and spaced from the center line throughout, rotatable means journaled in said frame means at a forward angle thereto and operatively connected to said rake means for imparting rotation and movement to said rake means in a rearward direction relative to the frame means and parallel thereto as the frame means is moved forwardly for both raking the crop toward the crop row center line and propelling the crop rearwardly, said rotatable means comprising spider means rotatably mounted in said frame means adjacent its ends, for rotation in parallel planes disposed at said forward angle relative to said rake means, drive means operatively connected to the spider means adjacent the rearward end of the frame means, said spider means being pivotally interconnected by said rake means.

3. A rake attachment for a corn harvester comprising, frame means operatively connected to the harvester and extending forwardly therefrom at an angle to a center line through a crop row and between adjacent crop rows, rake means disposed parallel to said frame means and spaced from the center line throughout, rotatable means journaled in said frame means at a forward angle thereto and operatively connected to said rake means for imparting rotation and movement to said rake means in a rearward direction relative to the frame means and parallel thereto as the frame means is moved forwardly for both raking the crop toward the crop row center line and propelling the crop rearwardly, said rake means comprising a plurality of parallel longitudinal rake members, each having a plurality of downwardly suspended raking teeth, said rake members being successively positioned downwardly toward the ground as it is moved rearwardly along its longitudinal axis parallel to the frame means, said rotatable means comprising spider means rotatably mounted in said frame means adjacent its ends for rotation in parallel planes angularly disposed at said forward angle relative to said rake members, drive means operatively connected to the spider means adjacent the rearward end of the frame means, said spider means being pivotally interconnected by said rake members.

4. The attachment as defined in claim 3, wherein said drive means is operative to impart rearward movement to each rake member in raking position at a speed in excess of forward motion of the attachment.

References Cited in the file of this patent
UNITED STATES PATENTS

| | | |
|---|---|---|
| 1,838,498 | Pospishil | Dec. 29, 1931 |
| 2,182,772 | Nightenhelser | Dec. 5, 1939 |
| 2,471,771 | Parks et al. | May 31, 1949 |
| 2,929,187 | Boggio | Mar. 22, 1960 |